Nov. 11, 1941.  D. W. EXNER  2,262,359

REGULATOR

Filed Nov. 15, 1939

WITNESSES:
E.A. McCloskey
Nw. C. Groome

INVENTOR
Donald W. Exner.
BY
Franklin E. Hardy
ATTORNEY

Patented Nov. 11, 1941

2,262,359

UNITED STATES PATENT OFFICE 2,262,359

REGULATOR

Donald W. Exner, Forest Hills, Pa., assignor to Westinghouse Electric & Manufacturing Company, East Pittsburgh, Pa., a corporation of Pennsylvania Application November 15, 1939, Serial No. 304,527

5 Claims. (Cl. 171—119)

My invention relates to regulating equipment for alternating-current generators, and particularly to means for initially raising the generator voltage substantially to its desired value.

When an isolated alternating-current generator is to be regulated by an electronic voltage regulator, it is necessary to provide means for causing the generator voltage to build up approximately to its normal value and to be maintained at that value a sufficient length of time to permit the cathodes of the regulator tubes to reach a satisfactory operating temperature before the control of the generator voltage by the electronic regulator is established. Previously, it has been the custom to provide an auxiliary source of direct-current energy, such as a battery, for effecting the initial energization of the generator field winding. In certain applications, as, for example, on airplanes—it is undesirable to provide the additional equipment including storage batteries for supplying the initial energization of the generator field winding, since this equipment is quite heavy and is required only at infrequent intervals.

It is an object of my invention to eliminate the need for an external source of power for effecting the build-up in the voltage of an alternating-current generator.

It is another object of the invention to provide means for effecting an increase in the voltage of an alternating-current generator to approximately its normal value from its own residual voltage.

It is a further object of the invention to provide equipment of the above-indicated character in which means is provided to limit overvoltage surges which may develop from a too quick increase in the generator voltage.

Figure 1:
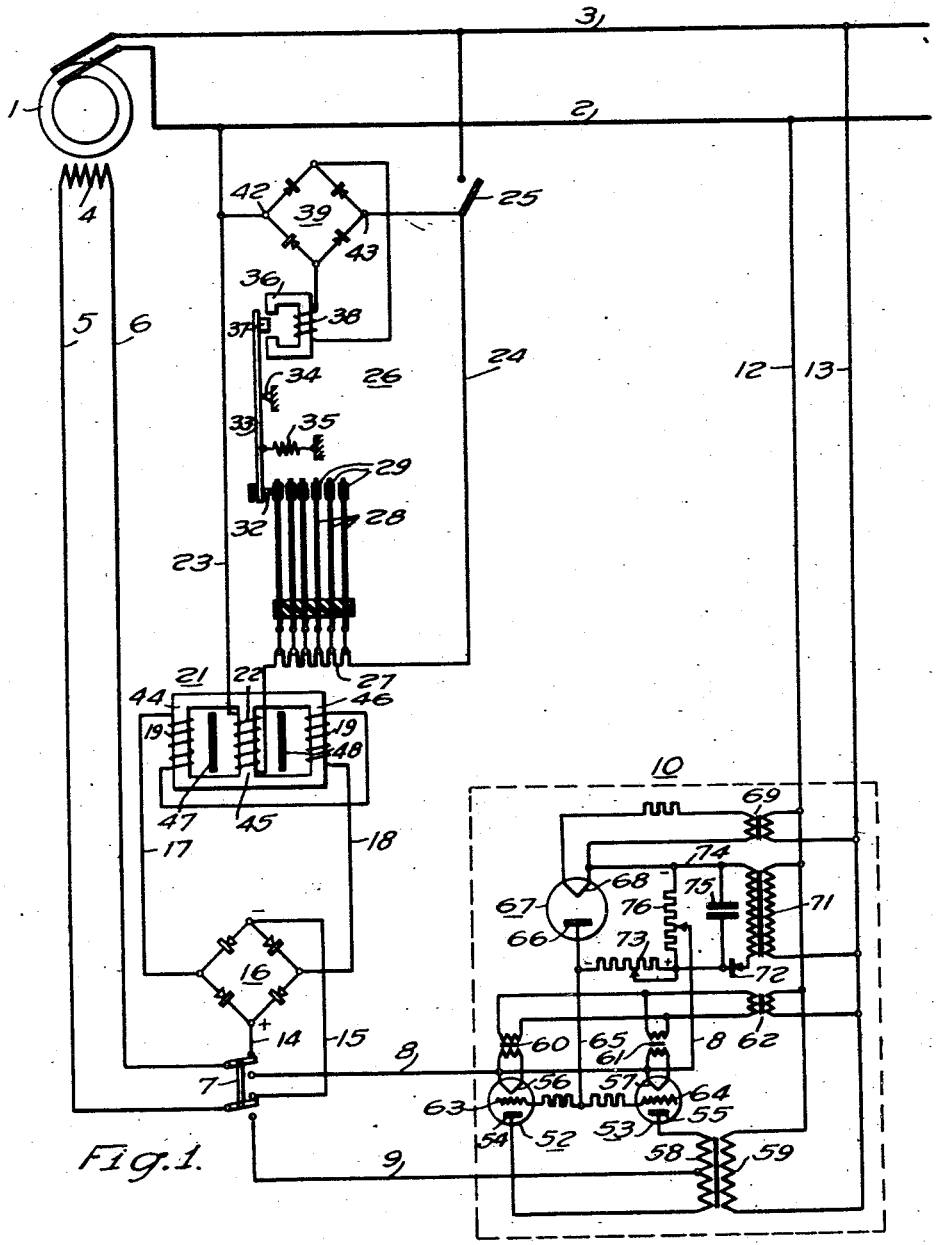
Figure 2:
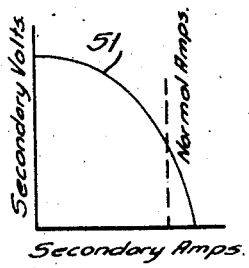

Other objects and advantages of the invention will be apparent from the following description of a preferred embodiment thereof, reference being had to the accompanying drawing, in which:

Figure 1 is a diagrammatic view of apparatus and circuits organized in accordance with the invention; and Figure 2 is a curve showing a characteristic of one of the devices used in the system disclosed.

In the drawing, an alternating-current generator 1 is provided, here shown as a single-phase machine for supplying energy to the circuit conductors 2 and 3. The generator 1 is provided with a field winding 4 that is connected by conductors 5 and 6 and switch 7 to receive energy either through conductors 8 and 9, from an electronic voltage regulator 10 connected by conductors 12 and 13 to the circuit conductors 2 and 3, respectively, or through conductors 14 and 15 from a dry-type full-wave rectifier unit 16. The rectifier 16 is supplied with energy through conductors 17 and 18 from secondary windings 19 of a transformer 21 having a primary winding 22 supplied with energy from the generator and through a circuit, including conductors 23 and 24, and switch 25. A regulator 26 is provided for varying or limiting the voltage applied to the primary winding 22 which may correspond to the regulator disclosed and claimed in application Serial No. 203,876, for Regulators, of C. R. Hanna and Stephen Sentipal, filed April 23, 1938, patented June 17, 1941, No. 2,246,301, and assigned to the same assignee as this application. Such a regulator controls a resistor 27, in circuit with the winding 22, by means of a plurality of flexible contact members 28 connected to spaced points along the resistor. The members 28 are provided with contact buttons 29 on their outer ends which are adapted to be brought into circuit closing engagement by operation of a driving element 32 carried by a lever 33 that is mounted to be pivoted at the point 34 and biased in one direction by a spring 35 and in the opposite direction by an electromagnet 36 acting on an armature 37 carried on the lever 33. The electromagnet 36 is energized by a winding 38 connected to the output terminals of a full-wave rectifier 39, the alternating-current terminals 42 and 43 of which are connected to the main circuit conductors 2 and 3, respectively, through switch 25.

As disclosed, the rectifier 16 is of the dry-disc type, and since the voltage initially applied will be low and it is desired that the resistance in series with the field winding be as low as possible, it is desirable to keep the number of discs in the several parts of the bridge circuit of the full-wave rectifier 16 as low as possible. Consequently, the transformer 21 is designed to have a step-up voltage ratio at low generator voltage values. It is necessary, therefore, to provide for limiting the output voltage from the transformer 21 as the generator voltage increases to prevent applying a high overvoltage to the rectifier 16 when the generator voltage builds up. This is particularly true in the case of a rapid increase in voltage, in which case the voltage applied to the primary winding 22 may reach a high value before the regulator 26 has responded to the increase in voltage and inserted resistance in series with the winding 22.

As shown, the transformer 21 is provided with a core having three winding legs 44, 45 and 46. The secondary winding 19 comprises two portions positioned about the two outer legs and the primary winding 22 is positioned about the center leg 45. Magnetic shunts 47 and 48 are provided and positioned in parallel relation to the winding legs between the primary and secondary windings, in order to increase the leakage reactance between the primary and secondary windings. This construction gives the transformer 21 a secondary volt-ampere characteristic represented by the curve 51 in Fig. 2. As indicated by this curve, with a constant primary voltage applied to the winding 22, the initial secondary voltage will be that shown along the axis of the ordinate of the curve in Fig. 2 and will decrease from that value as the secondary current increases. The rate of decrease will become marked, effecting a large decrease in output voltage from the transformer upon slight increases in secondary current when the secondary current output is near its normal value.

When it is desired to start the operation of the equipment, the generator 1 is first brought up to speed, the switch 7 is closed in its operative position illustrated in the drawing, and the switch 25 is closed, thus applying a voltage to the transformer winding 22 that is determined by the value of residual magnetism that is present as a result of a previous cycle of operation of the equipment. Thus a small output of alternating current flows from the windings 19 to the rectifier unit 16, causing a small unidirectional current to flow through the circuit including conductors 15 and 5 and the field winding 4 and conductors 6 and 14. This circuit is so connected that the field flux developed is cumulative with the residual magnetism in the field winding, thus increasing the total magnetism and causing the voltage of the generator 1 to increase. As the generator voltage increases, the voltage applied to the transformer 21 correspondingly increases and the output of unidirectional current from the rectifier 16 also increases. In the initial build-up of the generator voltage, the voltage applied to the rectifier 39 of the regulator 26 is small, so that the pull on the armature 37 is correspondingly small and the force of the spring 35 causes the driving member 32 to hold the contact buttons 29 in position to short-circuit all of the resistor 27 from the circuit of the transformer primary winding 22. As the generator voltage increases, the pull on the armature 37 correspondingly increases and becomes sufficient, as the generator voltage approaches its normal value, to operate the lever 33 in a direction to insert successive portions of the resistor 27 in series with the transformer primary winding 22 so as to maintain the generator output voltage at the desired value.

As previously explained, the characteristic of the transformer 21 is such that, should the generator voltage build up very rapidly, or before the mechanical regulator 26 has had time to come into effective operation, the extremely high leakage reactance characteristic of the transformer will cause the secondary voltage to drop rapidly as the secondary current approaches its normal value to thus limit the overvoltage that would otherwise be applied to the rectifier 16, and also prevent excessive increase in the generator output voltage.

When the generator voltage has been maintained for a sufficient period of time for the cathodes of the several tubes of the electronic regulator 10 to have reached operating temperature, the switch 7 may be moved quickly to its lower position, connecting the conductors 5 and 6 to conductors 9 and 8, respectively, to supply energy to the generator field winding 4 from the regulator equipment indicated generally at 10.

Any suitable electronic regulator may be provided that is adapted to receive alternating-current energy from conductors 12 and 13 and deliver controlled unidirectional energy through conductors 9 and 8 to maintain the generator voltage at the desired value. I have shown, for purposes of illustration, one such electronic voltage regulator in which rectifier tubes 52 and 53 are provided having anodes 54 and 55, respectively, and cathodes 56 and 57, respectively. The anodes 54 and 55 are connected to opposite ends of a secondary winding 58 of a transformer, whose primary winding 59 is connected to conductors 12 and 13. The output conductor 9 is connected to the midpoint of the winding 58, and the other output conductor 8 is connected to cathodes 56 and 57 of the tubes 52 and 53, respectively. Cathode transformers 60 and 61 are provided for supplying energy through transformer 62 to the cathodes 56 and 57 to maintain them at their desired temperatures. Control grids 63 and 64 are provided and are connected by conductor 65 to the anode 66 of a detector tube 67 having a cathode 68 connected by a transformer 69 and conductors 12 and 13 to be energized in accordance with the voltage across the generator output conductors 2 and 3. A transformer 71 is provided having a primary winding connected across the circuit conductors 12 and 13, and a secondary winding connected to supply energy to a circuit including a rectifier 72, a resistor 73, tube 67, and conductor 74. A condenser 75 and a resistor 76 are connected in parallel to provide a filter to reduce the alternating-current ripple in the tube circuit.

The grid circuit for the tubes 52 and 53 extends from the cathodes 56 and 57, through conductor 8, a selected portion of the resistor 76 in a direction to introduce a positive bias into the grid circuit, the resistor 73 in a direction to introduce a negative bias into the grid circuit, and conductor 65, to the grids 63 and 64. As the voltage of the generator 1 increases above the desired value, the voltage applied through the transformer 69 to the cathode 68 of the detector tube 67 correspondingly increases, thus increasing the flow of current through the resistor 73 and the tube 67, and increasing the negative bias on the grids 63 and 64, thus decreasing the output from the rectifier tubes 52 and 53 to decrease the current supplied to the field winding 4. Conversely, if the generator voltage decreases below the desired value, the conductivity of the detector tube 67 correspondingly decreases, thus decreasing the negative bias on the grids 63 and 64 and causing the conductivity of the rectifier tubes 52 and 53 to increase and supply a greater current to the field winding 4.

Modifications of the circuits and apparatus illustrated and described may be made within the spirit of my invention, and I do not wish to be limited otherwise than by the scope of the appended claims.

I claim as my invention:

1. In control equipment for an alternating-current generator having a field winding, means for effecting an increase in generator voltage to substantially its normal value comprising a rectifier unit having an output circuit connected to supply unidirectional current to the generator field winding in a direction to aid the residual magnetism thereof, and an input circuit connected to be energized at a voltage that is a measure of the generator voltage, and regulating means operative above a predetermined generator voltage for introducing controlled portions of a resistor in the rectifier input circuit.

2. In control equipment for an alternating-current generator having a field winding, means for effecting an increase in generator voltage to substantially its normal value comprising a rectifier unit having an output terminal connected to supply unidirectional current to the generator field winding in a direction to aid the residual magnetism thereof, and an input circuit connected to be energized at a voltage that is a measure of the generator voltage, regulating means operative above a predetermined generator voltage for introducing controlled portions of a variable resistor in the rectifier input circuit, and a saturable reactance device connected in circuit with the rectifier unit for limiting the input voltage thereto upon an increase in generator voltage above a predetermined value.

3. In control equipment for an alternating-current generator having a field winding, means for causing the generator voltage to build up to substantially its normal value comprising a rectifier of the dry-plate type for supplying unidirectional current to the field winding in a direction to aid the residual magnetism thereof, means for supplying alternating-current energy to said rectifier including a transformer having its primary winding supplied with alternating-current energy from the generator, said transformer having a high leakage reactance for effecting a rapid decrease in output voltage upon a slight increase in current output in the range of normal current output therefrom.

4. In control equipment for an alternating-current generator having a field winding, means for causing the generator voltage to build up to substantially its normal value comprising a rectifier of the dry-plate type for supplying unidirectional current to the field winding in a direction to aid the residual magnetism thereof, means for supplying alternating-current energy to said rectifier including a transformer having its primary winding supplied with alternating-current energy from the generator, said transformer having a high leakage reactance for effecting a rapid decrease in output voltage upon a slight increase in current output in the range of normal current output therefrom, and a regulator responsive to the generator voltage for regulating the voltage supplied to the transformer winding.

5. In control equipment for an alternating-current generator having a field winding, control means for supplying unidirectional current to the field winding comprising an electronic rectifier supplied with energy from the generator and a voltage regulator therefor, control means for increasing the generator excitation from its residual value to substantially its normal value comprising a rectifier of the dry-plate type for supplying unidirectional current to the field winding in a direction to aid the residual magnetism thereof, means for supplying alternating-current energy to said rectifier including a transformer having its primary winding supplied with alternating current from the generator, a regulator responsive to the generator voltage for regulating the voltage supplied to the transformer primary winding, and means for selectively connecting a selected one of said two control means in circuit with the generator field winding.

DONALD W. EXNER.